(12) United States Patent
Johansson et al.

(10) Patent No.: US 11,396,048 B2
(45) Date of Patent: Jul. 26, 2022

(54) TURNING TOOL AND METHOD FOR METAL CUTTING

(71) Applicant: SANDVIK INTELLECTUAL PROPERTY AB, Sandviken (SE)

(72) Inventors: Adam Johansson, Sandviken (SE); Ronnie Lof, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 96 days.

(21) Appl. No.: 16/647,006

(22) PCT Filed: Mar. 21, 2018

(86) PCT No.: PCT/EP2018/057164
§ 371 (c)(1),
(2) Date: Mar. 12, 2020

(87) PCT Pub. No.: WO2019/052693
PCT Pub. Date: Mar. 21, 2019

(65) Prior Publication Data
US 2020/0206825 A1    Jul. 2, 2020

(30) Foreign Application Priority Data
Sep. 15, 2017  (EP) ..................... 17191355

(51) Int. Cl.
*B23B 27/14*  (2006.01)
*B23B 1/00*  (2006.01)
*B23B 29/24*  (2006.01)

(52) U.S. Cl.
CPC ............. *B23B 27/145* (2013.01); *B23B 1/00* (2013.01); *B23B 29/24* (2013.01); *B23B 2200/0423* (2013.01)

(58) Field of Classification Search
CPC ........ B23B 2200/0423; B23B 2200/28; B23B 2210/02; B23B 2220/445; B23B 27/005;
(Continued)

(56) References Cited

U.S. PATENT DOCUMENTS

| 2,630,725 | A | * | 3/1953 | Black | ...................... B23B 29/03 |
| | | | | | 408/224 |
| 4,175,895 | A | * | 11/1979 | Burroughs | .............. B23B 5/167 |
| | | | | | 30/172 |

(Continued)

FOREIGN PATENT DOCUMENTS

| CA | 2669025 A1 * | 1/2010 | ........... B23B 51/107 |
| DE | 2031832 A1 * | 12/1971 | ............. B23B 27/08 |

(Continued)

*Primary Examiner* — Sara Addisu
(74) *Attorney, Agent, or Firm* — Corinne R. Gorski

(57) ABSTRACT

A turning tool for internal turning of a metal work piece having a rear end, an opposite forward end and a longitudinal center axis extending therebetween. The first nose cutting edge includes a first radially distal point having an associated first rake face and separates and connects a first forward cutting edge and a first rearward cutting edge. A second nose cutting edge of the turning tool includes a second radially distal point having an associated second rake face and separates and connects a second forward cutting edge and a second rearward cutting edge. The second radially distal point is positioned ahead of the first radially distal point. The first forward cutting edge forms an acute first entering angle, the second forward cutting edge forms an obtuse second back clearance angle, and the second rearward cutting edge forms an acute second entering angle.

18 Claims, 10 Drawing Sheets

(58) Field of Classification Search
CPC ..... B23B 27/007; B23B 27/145; B23B 29/24;
B23B 29/145; B23B 1/00
See application file for complete search history.

(56) References Cited

U.S. PATENT DOCUMENTS

| | | | |
|---|---|---|---|
| 4,375,708 A * | 3/1983 | Hellnick | B23B 5/167 |
| | | | 29/566 |
| 2007/0081867 A1 | 4/2007 | Murakami et al. | |
| 2011/0222979 A1 * | 9/2011 | Stadelmann | B23B 29/03407 |
| | | | 408/147 |
| 2012/0230790 A1 * | 9/2012 | Uno | B23D 31/003 |
| | | | 408/227 |
| 2017/0100776 A1 * | 4/2017 | Lof | B23B 27/145 |
| 2018/0093329 A1 * | 4/2018 | Umstadt | F16F 15/02 |
| 2019/0262905 A1 * | 8/2019 | Liu | B23B 5/02 |

FOREIGN PATENT DOCUMENTS

| | | | | |
|---|---|---|---|---|
| DE | 2617455 A1 * | 11/1977 | | B23B 27/1611 |
| DE | 2830403 A1 * | 1/1980 | | B23B 27/007 |
| DE | 2830403 A1 | 1/1980 | | |
| DE | 3008008 A1 * | 9/1981 | | B23B 29/034 |
| DE | 4214355 A1 | 11/1993 | | |
| DE | 19846548 A1 * | 5/2000 | | B23B 27/00 |
| DE | 10317344 A1 * | 11/2004 | | B23B 1/00 |
| DE | 102012015163 A1 | 2/2014 | | |
| EP | 2050529 A2 | 4/2009 | | |
| EP | 3153260 A1 | 4/2017 | | |
| KR | 20090109631 A * | 10/2009 | | B23B 29/24 |
| SU | 1537386 A1 * | 1/1990 | | B23B 29/24 |
| WO | WO-2018170611 A1 * | 9/2018 | | B23B 29/26 |
| WO | WO-2021007015 A1 * | 1/2021 | | B23Q 11/0032 |

* cited by examiner

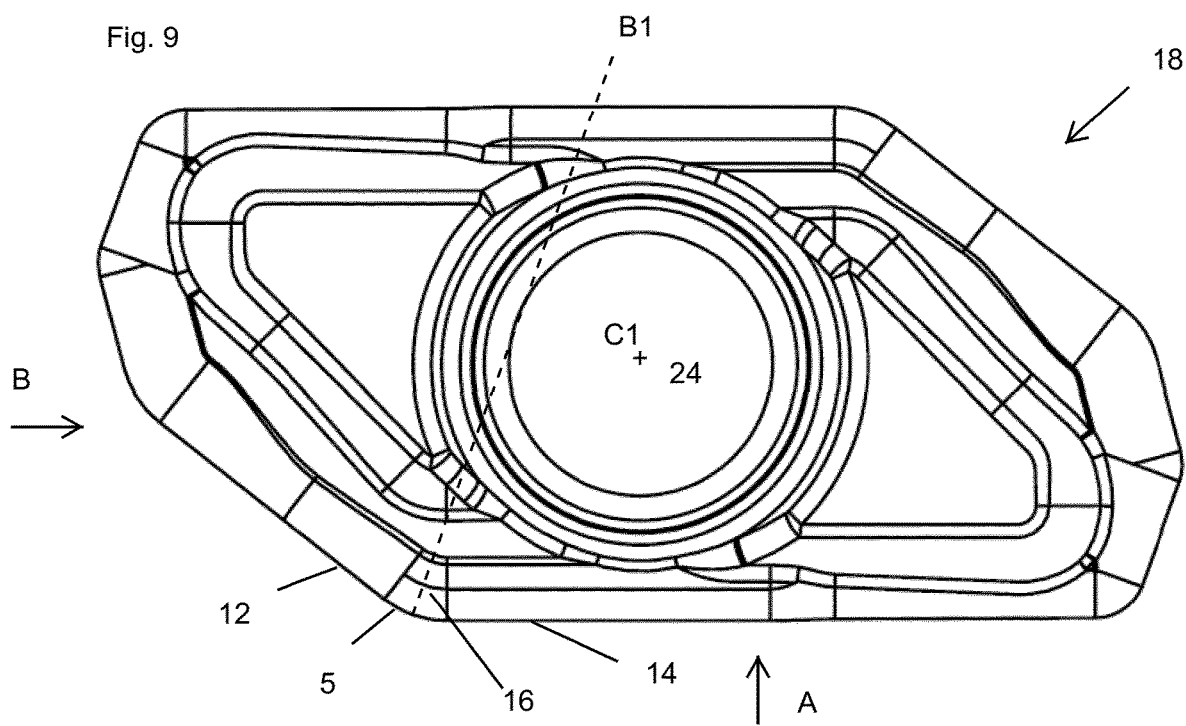
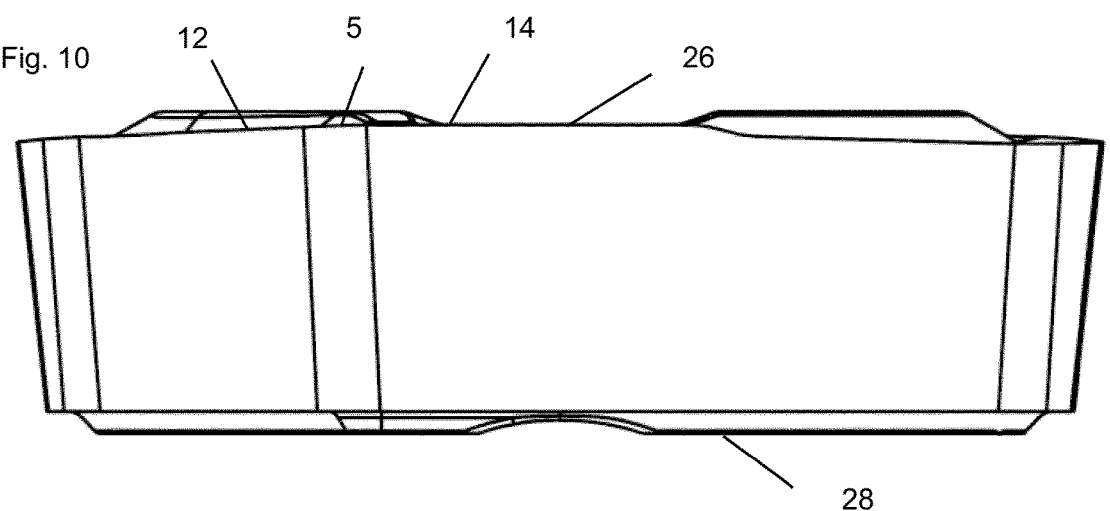
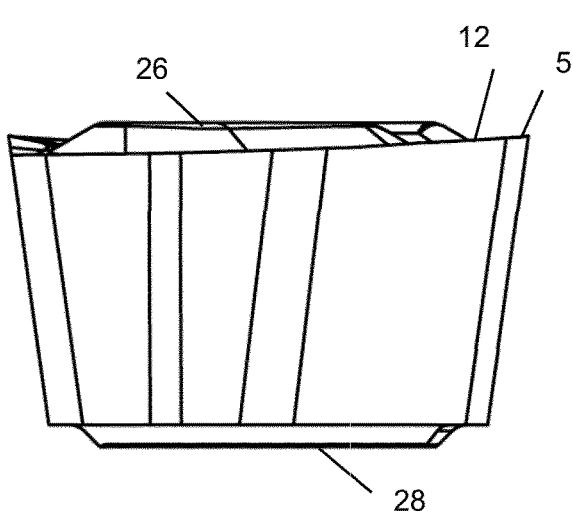

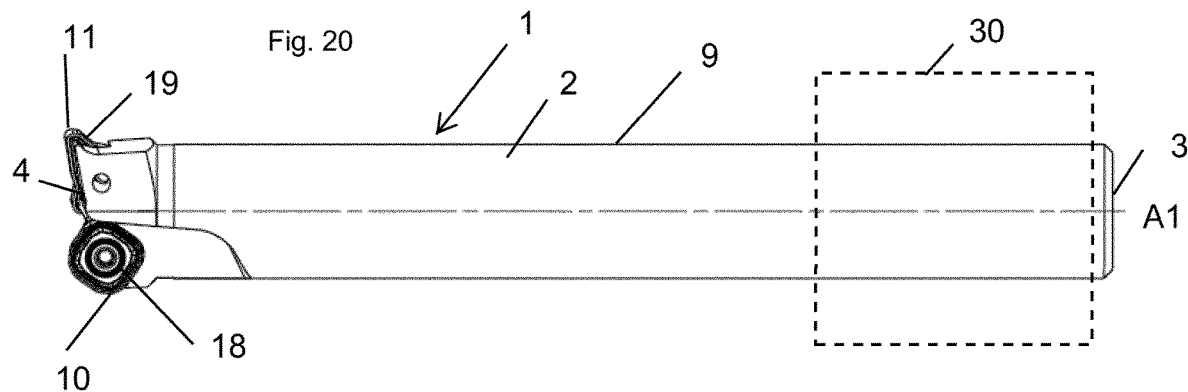
Fig. 20
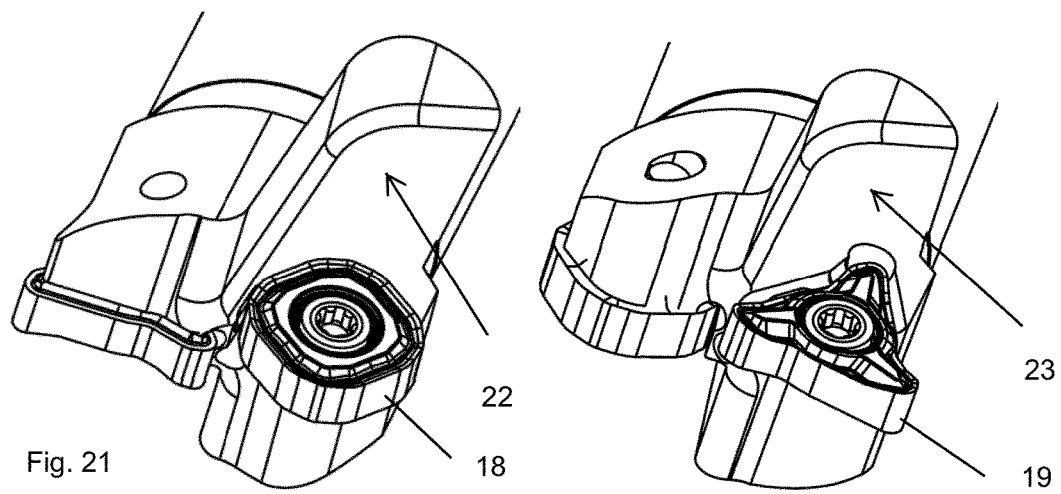
Fig. 21
Fig. 22
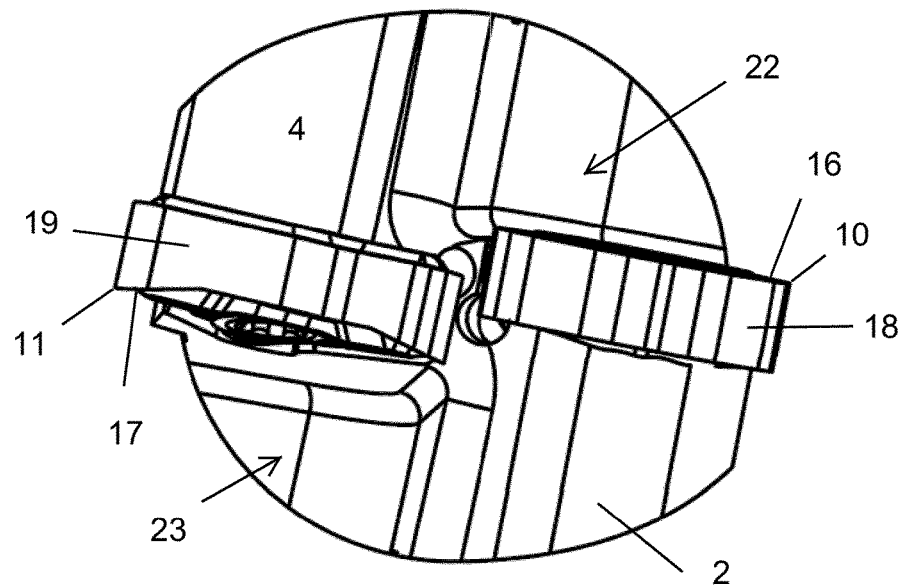
Fig. 23

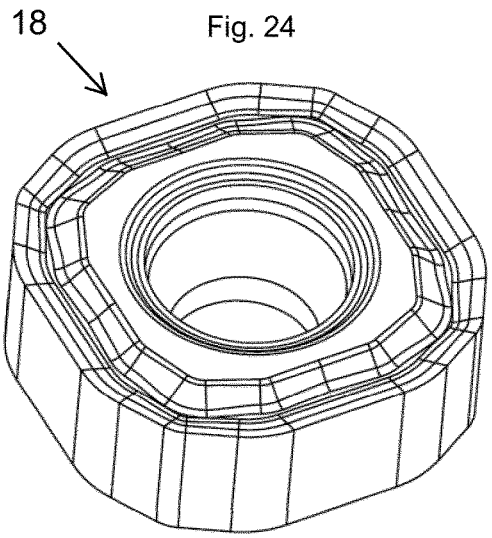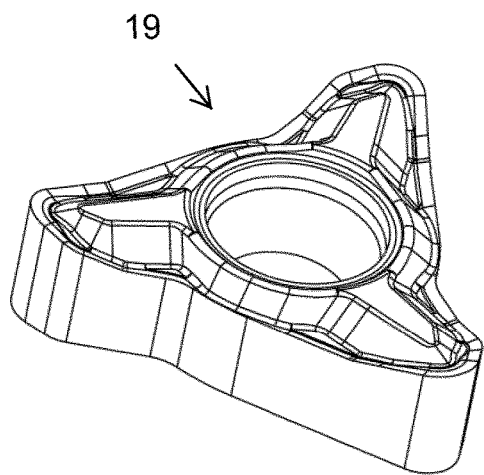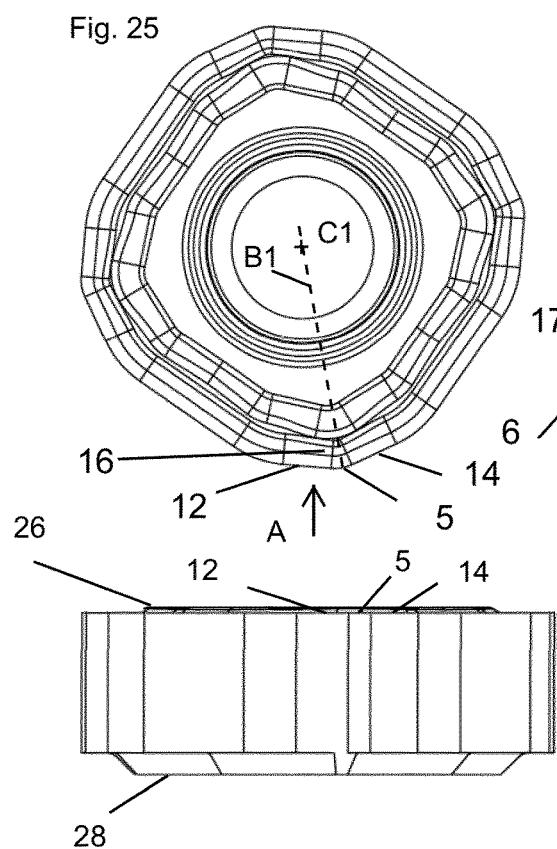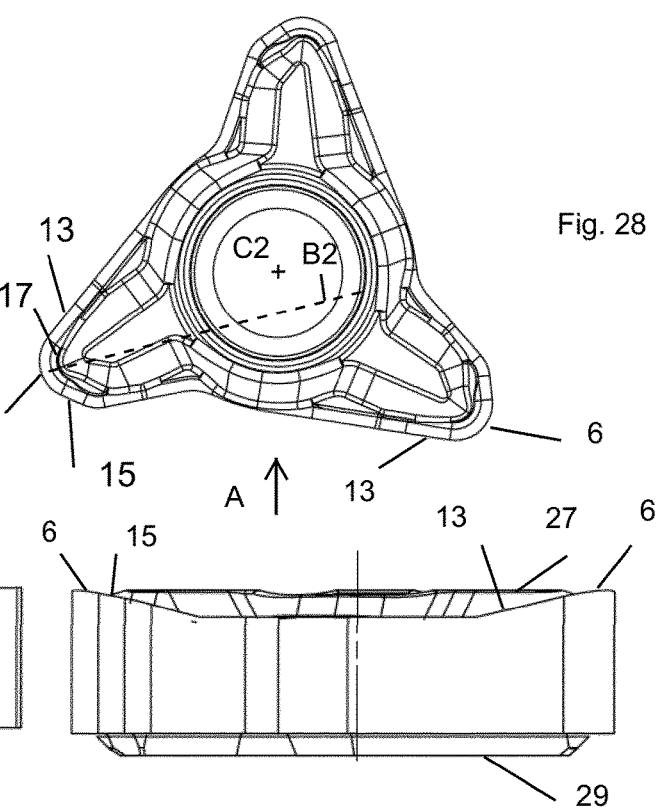

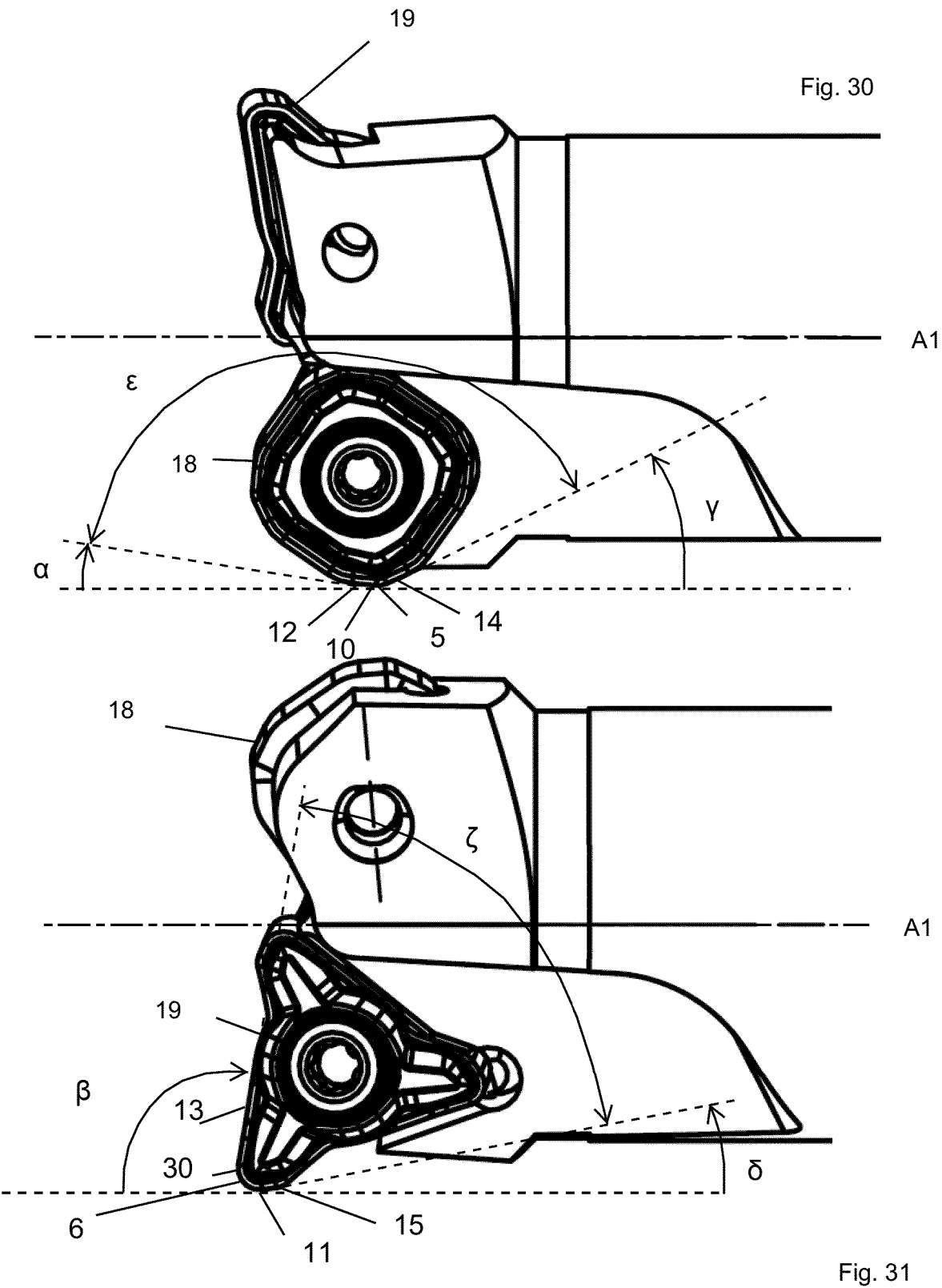

TURNING TOOL AND METHOD FOR METAL CUTTING

RELATED APPLICATION DATA

This application is a § 371 National Stage Application of PCT International Application No. PCT/EP2018/057164 filed Mar. 21, 2018 claiming priority to EP 17191355.1 filed Sep. 15, 2017.

TECHNICAL FIELD OF THE INVENTION

The present invention belongs to the technical field of metal cutting.

More specifically the present invention belongs to the field of turning tools for internal turning, for metal cutting in machines such as computer numerical control, i.e. CNC, machines.

BACKGROUND OF THE INVENTION AND PRIOR ART

The present invention refers to a turning tool for internal turning of a metal work piece, comprising a rear end, an opposite forward end and a longitudinal center axis extending therebetween, a first nose cutting edge comprising a first radially distal point having an associated first rake face, the first nose cutting edge separating and connecting a first forward cutting edge and a first rearward cutting edge.

Such a turning tool is known from US 2007/0081867 A1. Said known turning tool is a boring bar, or a turning tool for internal turning. Said turning tool comprise a shank and a turning insert. In internal longitudinal turning, the turning tool is moved in a feed direction towards a bottom of a hole of a work piece. The entering ange is greater than 90°. The turning tool comprise only one turning insert. The turning tool is used for turning in only one direction, towards the bottom of the hole. The problem regarding the flow direction of the chips and smooth evacuation of the chips from the hole are claimed to be improved by a coolant flow from a coolant nozzle. The turning tool can be used to machine a 90° corner inside the hole. The turning tool can be used to machine a blind hole.

SUMMARY OF THE INVENTION

When using the known turning tool for longitudinal turning into the hole, and especially at cutting depths that are equal to or less than the nose radius or corner radius of the turning insert, the chip breaking is poor, which results in, e.g. poor chip evacuation. Thus there is a need to reduce the wear of the turning insert of the known turning tool. Longitudinal turning of a hole may in many cases preferably be made in two or more passes, such as a first pass for roughing followed by a second finishing pass. therefore, the cutting portion of the tool should preferably be different when roughing compared to finishing. In such cases, using two separate turning tools is less cost-efficient and more time-consuming, as well as presenting other draw-backs.

An object of the present invention is to provide a turning tool which is suitable for internal longitudinal turning, especially for generating an inner surface having a constant diameter, where higher feed rate can be used when feeding into a hole of a metal work piece. A further object is to improve chip evacuation from a hole of metal work piece.

A still further object is to provide a turning tool which can be used for both roughing and finishing.

At least one of the above objects is achieved with the initially defined turning tool, which is characterized in that the turning tool comprises a second nose cutting edge comprising a second radially distal point having an associated second rake face, the second nose cutting edge separating and connecting a second forward cutting edge and a second rearward cutting edge, the first and second radially distal points being positioned on opposite sides or substantially opposite sides relative to the longitudinal center axis, the first and second rake faces facing opposite or substantially opposite directions, the second radially distal point being positioned ahead of the the first radially distal point, the first forward cutting edge forming an acute first entering angle, the second forward cutting edge forming an obtuse second back clearance angle, and the second rearward cutting edge forming an acute second entering angle.

By such a turning tool, both roughing, or machining with a low entering angle, and finishing, or machining with a high entering angle can be made with one tool.

By such a turning tool, longitudinal feed in opposite directions on opposite sides of a rotational axis, or center line, of a metal work piece is possible, while rotating the metal work piece in a rotational direction. By doing this, cycle times in hole machining can be optimized, or reduced, by machining both when entering the hole and when exiting the hole. By such a turning insert, at least a portion of the surface, having a constant diameter, generated by the first nose cutting edge can be machined by the second nose cutting edge.

An acute entering angle when feeding towards the bottom of the hole gives a reduced insert wear. Hence, the tool life is improved, alternatively the feed rate may be increased.

Compared to an obtuse entering angle when feeding towards the bottom of the hole, an acute entering angle may to a greater extent direct the chip in a direction out of the hole, thereby improving chip evacuation.

When having an obtuse entering angle when longitudinal turning into the hole, and especially at cutting depths, which is equal to or less than the radius of the nose cutting edge, the chip breaking is poor which result in e.g. poor chip evacuation. This problem may be reduced by having an acute entering angle.

By arranging the turning tool such that the turning tool comprises a second forward cutting edge forming an obtuse second back clearance angle, and by arranging the second radially distal point ahead of the first radially distal point, a 90° corner can be formed, where one surface of the 90° corner is a flat surface perpendicular to the rotational axis of the metal work piece, and a second surface of the 90° corner is a surface concentric with the rotational axis of the metal work piece.

The turning tool may preferably comprise a tool body, preferably made from steel, and at least one, preferably two, turning inserts, preferably made from a more wear resistant material than the tool body, preferably cemented carbide. The turning insert or inserts are preferably clamped to the tool body by means of one or more clamping screws.

The turning tool may consist of a single piece of cemented carbide, or any other suitable wear-resistant material for metal cutting, having two opposite nose cutting edges.

The turning tool may comprise only one turning insert, which may be attached or attachable to a tool body, together defining the turning tool.

The turning tool is for internal turning of a metal work piece. More specifically, the turning tool is for generating by metal cutting an internal surface which is concentric with a rotational axis of the metal work piece. The metal work piece comprises a hole, concentric or substantially concentric with the rotational axis, which may be in form of preferably a blind hole, or alternatively a through hole. The metal work piece may preferably be made from steel.

The turning tool comprises a rear end, which is adapted to be clamped directly or indirectly to a machine interface of a machine tool, preferably a computerized numerical control lathe.

The turning tool comprises an opposite forward end which during machining of the hole is inside the hole.

A longitudinal center axis of the turning tool extends between the front end and the rear end, defining a front direction or a forward direction toward the front end, and an opposite rear direction or rearward direction. The turning tool is preferably partly cylindrical or substantially cylindrical in shape. More specifically, the turning tool is preferably partly concentric or substantially concentric with the longitudinal center axis.

The rear end may be circular or substantially circular, or alternatively any other shape suitable for connecting to a machine interface of a CNC turning lathe for internal longitudinal turning. Such alternative shapes includes the shape described in ISO standard 26623.

The turning tool comprises a first nose cutting edge, which is suitable for being a first surface generating or surface wiping edge in longitudinal turning, i.e. a feed direction parallel to the rotational axis of the work piece. The first nose cutting edge is convex in a top view.

Preferably, the first nose cutting edge is convexly curved in a top view.

The turning tool comprises first and second radially distal points, i.e. distal end points.

An imaginary plane is located mid-way between the first and second radially distal points, dividing the turning tool in two halves, or two semicircle-like shapes, in a front view.

The first radially distal point is the point of one of said halves of the turning tool which is located at the greatest distance from the longitudinal center axis.

The second radially distal point is the point of the other one of said halves of the turning tool which is located at the greatest distance from the longitudinal center axis.

The radially distal point and the first nose cutting edge have an associated first rake face. The rake face, or cutting face, is the surface of the turning tool which during use, i.e. during cutting, is in contact with the chip which is removed. The rake face is preferably a top surface, or a portion of a top surface, of a turning insert, where said top surface comprises chip breaking means or chip forming means, preferably in the form of one or more protrusions.

The first nose cutting edge is separating and connecting a first forward cutting edge and a first rearward cutting edge, where the first forward cutting edge is ahead of the first nose cutting edge in the forward direction.

A first bisector extend mid-way between the first forward cutting edge and the first rearward cutting edge.

The first forward cutting edge is preferably straight or substantially straight in a top view. In longitudinal turning, i.e. feed direction parallel to the rotational axis of the metal work piece, in a forward direction, i.e. into the hole, the first forward cutting edge is arranged to function as a main cutting edge or a leading edge, the first nose cutting edge is arranged to function as a surface generating cutting edge and the first rearward cutting edge is arranged to function as a secondary cutting edge or a relief cutting edge or trailing edge. The nose cutting edge is in longitudinal turning arranged to generate a surface which is cylindrical or concentric with the rotational axis of the metal work piece.

The turning tool comprises an in a top view preferably convex or convexly curved second nose cutting edge comprising the second radially distal point, having an associated second rake face or cutting face, arranged to be in contact with the chip cut from the metal work piece.

The second nose cutting edge is separating and connecting a second forward cutting edge, preferably straight or substantially straight in a top view, and a second rearward cutting edge, preferably straight or substantially straight in a top view.

A second bisector extend mid-way between the second forward cutting edge and the second rearward cutting edge.

In longitudinal turning, i.e. feed direction parallel to the rotational axis of the metal work piece, in a rearward direction, i.e. out of the hole, the second forward cutting edge is arranged to function as a secondary cutting edge or a relief cutting edge or a trailing edge, the second nose cutting edge is arranged to function as a surface generating cutting edge and the second rearward cutting edge is arranged to function as a main cutting edge or a leading cutting edge.

The nose cutting edge is in longitudinal turning arranged to generate a surface which is cylindrical or concentric with the rotational axis of the metal work piece.

The first and second radially distal points are positioned on opposite sides or substantially opposite sides relative to the longitudinal center axis in such a way that in a front view of the turning tool, an angle between the first and second radially distal points is 180°+/−20°, preferably +/−5°.

The first and second radially distal points are each spaced apart from the longitudinal center axis. Preferably, a distance from the longitudinal center axis to the second radially distal point is greater, preferably 1-25% greater, than a distance from the longitudinal center axis to the second radially distal point, in order to improve the function of the turning tool to remove chips by pulling or dragging the chips out of the hole.

The first and second rake faces facing opposite or substantially opposite directions. In other words, seen in a front view, when the first rake face is facing downwards, the second rake face is facing upwards or substantially upwards.

The second radially distal point is ahead of, i.e. forward of, the the first radially distal point, preferably by a distance of 0.5-10 mm, even more preferably by a distance of 1.0-5 mm.

The second nose cutting edge is ahead of the first nose cutting edge.

The first forward cutting edge forms an acute, i.e. less than 90°, first entering angle. Said first entering angle is defined as the angle which the first forward cutting edge forms in relation to the feed direction in longitudinal turning into the hole, i.e. in a forward direction.

The first entering angle is defined at a cutting depth of 0.2 mm in longitudinal turning.

The second forward cutting edge forms an obtuse, i.e. greater than 90°, second back clearance angle or relief angle. In other words, the second forward cutting edge form a clearance angle in relation to the machined surface which is greater than 90°, when longitudinal turning out of the hole, and when the second rearward cutting edge is active.

The second rearward cutting edge forms an acute, i.e. less than 90°, second entering angle. Said second entering angle is defined as the angle which the second rearward cutting edge forms in relation to the feed direction in longitudinal turning out of the hole, i.e. in a rearward direction. The second entering angle is defined at a cutting depth of 1.0 mm in longitudinal turning.

According to an embodiment, the second nose cutting edge comprises an axially forward distal point which define the singular axially forward end point of the turning tool, a second bisector extend mid-way between the second forward cutting edge and the second rearward cutting edge, the axially forward point and the second radially distal point are positioned on opposite sides of the second bisector.

By such a turning tool, the ability to machine an inner 90° corner is further improved. For example, the ability to machine an inner 90° corner inside a blind hole is further improved.

For example, by such a turning tool a bottom surface of a blind hole having a relatively great diameter can be machined such that the second forward cutting edge is the main cutting edge. Said bottom surface is perpendicular to a rotational axis of a metal work piece.

The second nose cutting edge comprises an axially forward distal point, i.e. a distal end point, which define the singular axially forward end point of the turning tool. In other words, the axially forward distal end point is forward of all other parts of the turning tool.

The second nose cutting edge is preferably convexly curved in a top view, i.e. the second nose cutting edge is preferably arc-shaped. The second nose cutting edge preferably has a radius of curvature thereof which is within the range of 0.1-2.0 mm, more preferably 0.15-1.3 mm.

According to an embodiment, the first rearward cutting edge forming an acute first back clearance angle.

By such a turning tool, the tool life of the turning tool is further improved. Especially, the wear of the first nose cutting edge is further reduced.

The first rearward cutting edge forms an acute first back clearance angle relative to the machined surface in longitudinal turning into the hole when the first forward cutting edge is active.

Preferably, the acute first back clearance angle is 1-20°, more preferably 2-20°, even more preferably 2-10°.

According to an embodiment, the acute first entering angle is 4-40°.

By such a turning tool, the tool life of the turning tool is further improved. Especially, the wear of the first forward cutting edge is further reduced.

Preferably, the acute first entering angle is 4-38°.

According to an embodiment, the obtuse second back clearance angle is 91-120°.

By such a turning tool, the tool life of the turning tool is further improved. Especially, the wear of the second nose cutting edge is further reduced.

Preferably, the obtuse second back clearance angle is 92-100°.

According to an embodiment, the acute second entering angle is 4-80°.

Preferably, the acute second entering angle is 4-44°.

According to an embodiment, the first nose cutting edge has a first nose angle, defined by an angle between the first forward cutting edge and the first rearward cutting edge, which is obtuse.

By such a turning tool, the tool life of the turning tool is further improved. Especially, the wear of the first nose cutting edge is further reduced.

Preferably, first nose angle is 100-160°, more preferably 120-160°, even more preferably 135-155°.

According to an embodiment, the turning tool comprises a tool body, a first turning insert and a second turning insert, wherein the tool body comprises an external peripheral surface, wherein the external peripheral surface comprises a portion which is circular or substantially circular in cross sections perpendicular to the longitudinal center axis, wherein the tool body comprises a first insert seat and an opposite second insert seat, wherein the tool body comprises a first chip pocket, adjacent to the first insert seat, and an opposite second chip pocket, adjacent to the second insert seat, wherein the first and second insert seats are spaced apart, wherein the first and second chip pockets are spaced apart, wherein the first and second chip pockets opens towards the forward end, wherein the first turning insert is located in the first insert seat, wherein the second turning insert is located in the second insert seat, in that the first turning insert comprising the first nose cutting edge, the first rake face, the first forward cutting edge and the first rearward cutting edge, in that the first turning insert comprises a first top surface and an opposite first bottom surface, in that the second turning insert comprising the second nose cutting edge, the second rake face, the second forward cutting edge and the second rearward cutting edge, in that the second turning insert comprises a second top surface, comprising the first rake face, and an opposite second bottom surface, comprising the second rake face, in that the first turning insert and the second turning insert partially overlap in the longitudinal direction as defined by the longitudinal center axis.

By such a turning tool, having two turning insert which can be replaced, the turning tool is more economical. By such a turning tool, the performance can be improved e.g. by making it possible to make the first and second turning inserts from different materials.

A turning tool is thus a turning tool having a tool body, preferably made from steel, or comprising steel. The turning tool comprises a first and a second turning insert, each made from a more wear resistant material than the tool body, preferably cemented carbide.

The tool body comprises an external peripheral surface, where a portion thereof is circular or substantially circular in cross sections perpendicular to the longitudinal center axis. The tool body is thus arranged for machining of holes or bores, in particular circular holes or bores.

The tool body comprises a first and an in relation to the longitudinal center axis opposite second insert seat, i.e. insert receiving pockets, wherein each of the first and second insert seats preferably comprise seating surfaces in the form of a bottom surface and a side surface.

The tool body comprises a first chip pocket or first chip space, adjacent to the first insert seat, and an in relation to the longitudinal center axis opposite second chip pocket or chip space, adjacent to the second insert seat, where said chip pockets are in the form of recesses or cut-outs formed in the tool body.

Preferably, one or more fluid channels are arranged inside the tool body. Preferably the fluid channel or channels comprises a first exit, preferably in the form of a first coolant nozzle, opening into the first chip pocket. Preferably the fluid channel or channels comprises a second exit, preferably in the form of a second coolant nozzle, opening into the second chip pocket.

The first and second insert seats are spaced apart and are preferably each spaced apart from the longitudinal center axis.

The first turning insert is located or in the first insert seat, by clamping means, such as a top-clamp or a clamping screw.

The second turning insert is located in the second insert seat, by similar claimping means.

The first turning insert comprises the first nose cutting edge, the first rake face, the first forward cutting edge, the first rearward cutting edge, a first top surface and an opposite first bottom surface, where the first top surface comprises the first rake face, and where the first top surface preferably comprises chip breaking means and/or chip forming means, preferably comprising one or more protrusions.

The second turning insert comprises the second nose cutting edge, the second rake face, the second forward cutting edge, the second rearward cutting edge, a second top surface and an opposite second bottom surface, where the second top surface comprises the second rake face, and where the second top surface preferably comprises chip breaking means and/or chip forming means, preferably comprising one or more protrusions.

The shape of the first cutting insert preferably differs from the shape of the second turning insert.

The first turning insert preferably comprises 2 or more sets of cutting edges, such that the first turning insert is usable in after a rotation of a preternined angle.

The second turning insert comprises one or more sets of cutting edges.

Preferably, the first cutting insert comprises more sets of cutting edges than the second cutting insert.

The first turning insert and the second turning insert partially overlap, such that an axially forward point of the second turning insert is ahead of an axially forward point of the first turning insert, and such that an axially rearward point of the second turning insert is behind the axially forward point of the first turning insert, where "forward", "ahead" and "behind" is seen in the longitudinal direction as defined by the longitudinal center axis.

According to an embodiment, the first turning insert is 90° or 180° symmetrical in a top view, in that the first turning insert comprises a first screw hole opening in the first top and bottom surfaces, in that a first bisector extend mid-way between the the first forward cutting edge and the first rearward cutting edge, in that the first rearward cutting edge in a top view is straight or substantially straight between a first end, adjacent to the first nose cutting edge, and an opposite second end.

By such a turning tool, the economy is further improved because the first turning insert can be indexed to more than one position.

The first turning insert is 90° or 180° symmetrical in a top view. In other words, the top surface of the first turning insert comprises two or for identical or substantially identical sets of cutting edges.

The first turning insert comprises a first screw hole preferably in the form of a through hole, opening in the first top and bottom surfaces.

The first screw hole is preferably circular in cross sections perpendicular to a first center axis thereof.

According to an embodiment, the second turning insert comprises a second screw hole opening in the second top and bottom surfaces, in that a second bisector extend midway between the second forward cutting edge and the second rearward cutting edge, wherein the second bisector or an extension of the second bisector is spaced apart from a second center axis of the second screw hole, in that a distance from the second rearward cutting edge to the second bottom surface is decreasing away from the second nose cutting edge, and in that a distance from the second forward cutting edge to the second bottom surface is decreasing away from the second nose cutting edge.

By such a turning tool, the chip evacuation can be further improved.

The second turning insert comprises a second screw hole, preferably in the form of a through hole, opening in the second top and bottom surfaces. The second bisector or an extension of the second bisector is spaced apart, preferably by a distance of 0.5-5 mm, from a second center axis of the second screw hole as seen in a top view.

The second screw hole is preferably concentric or substantially concentric with the second center axis of the second screw hole.

A distance from the second rearward cutting edge to the second bottom surface is decreasing away from the second nose cutting edge. In other words, the second rearward cutting edge, or a portion thereof, is sloping downwards away from the second nose cutting edge as seen in a side view.

A distance from the second forward cutting edge to the second bottom surface is decreasing away from the second nose cutting edge. In other words, the second forward cutting edge, or a portion thereof, is sloping downwards away from the second nose cutting edge as seen in a side view.

The second forward cutting edge and the second rearward cutting edge are each preferably straight, or substantially straight, as seen in a top view. In a top view, the second forward cutting edge is preferably longer, preferably 3-12 times longer, than the second rearward cutting edge.

Preferably, the second top surface comprises a protrusion, which protrusion intersect the second bisector in a top view.

The second turning insert may comprise only one set of cutting cutting edges. The second turning insert may comprise 3 sets of cutting edges, such that the second turning insert is 120° symmetrical in a top view.

According to an embodiment, at least a portion of the second forward cutting edge is longitudinally forward of a forward end of the tool body.

By such a turning tool, the turning tool is even more suitable for using the second nose cutting edge for machining a surface adjacent to a bottom surface of a blind hole, where the bottom surface of the blind hole is perpendicular to the rotational axis of the metal work piece.

At least a portion of the second forward cutting edge is longitudinally forward, measured along the longitudinal center axis, of a forward end of the tool body. Preferably, a portion of the the first turning insert is longitudinally forward of a forward end of the tool body.

According to an embodiment, the turning tool comprises exactly two turning inserts, and in that the two turning inserts are different in shape.

By such a turning tool, comprising exactly two turning inserts, the turning tool can be made in a more economical manner compared to a turning tool comprising three or more turning inserts.

The two turning inserts, i.e. the first turning insert and the second turning insert, are different in shape seen in a top view.

According to an embodiment, a machining method comprising the steps of: providing a metal work piece comprising a hole, providing a computerized numerical control lathe, providing a turning tool according to the invention or an embodiment of the invention, clamping the metal work piece by the computerized numerical control lathe, connecting the turning tool to a machine interface of the computerized numerical control lathe, rotating the metal work piece in a rotational direction around a rotational axis thereof, arranging the longitudinal center axis of the turning tool parallel to the rotational axis, machining the hole by moving the turning tool in a first feed direction, parallel to or substantially parallel to the rotational axis such that the first forward cutting edge is active and such that a first inner surface is formed by the first nose cutting edge.

By such a machining method, the insert wear and/or chip evecatuation is improved when forming a first inner surface of a hole, where the first inner surface is concentric or substantially concentric with the rotational axis.

The machining method is a metal cutting method. The metal work piece may be in the form of a piece of metal bar, in which a hole have been formed, e.g. by a drilling operation. Said hole may be in the form of a through hole, or preferably in the form of a blind hole.

Alternatively, the metal work piece may be in the form of a piece of hollow bar or a tube or a pipe.

Said hole is preferably concentric or substantially concentric around a rotational axis of the metal work piece. Said hole preferably has a diameter thereof which is 5-500 mm, more preferably 12-150 mm.

Said hole diameter is preferably constant or substantially constant.

A machine tool in the form of a computerized numerical control lathe, i.e. a CNC-lathe, is provided. The CNC-lathe comprises clamping means, such as jaws, which is arranged to clamp the metal work piece. The CNC-lathe comprises a motor, which is arranged to rotate the metal work piece around a rotational axis thereof.

The turning tool is connected or clamped to a machine interface of the CNC-lathe. The machine interface preferably comprises a cavity inside which the rear end or a rear portion of the turning tool is located.

The clamping means and the machine interface are preferably located on opposite sides of the metal work piece.

The machining method comprises the step of rotating the metal work piece in a predetermined rotational direction around a rotational axis. The longitudinal center axis (A1) of the turning tool (2) is arranged or set or positioned or oriented parallel to the rotational axis (A2). This relative orientation is preferably constant throughout all machining steps.

The machining of the hole is made by moving the turning tool into the hole in a first feed direction, parallel to or substantially parallel to the rotational axis, such that the first forward cutting edge is active and such that a first inner surface is formed by the first nose cutting edge.

The machining method preferably comprises the step of entering the metal work piece by the first forward cutting edge at an opening of the hole.

Said first inner surface is a machined surface which is concentric, within +/−0.2 mm, with the rotational axis. The feed rate during machining, i.e. in the first feed direction, is preferably within 0.1-1.0 mm/revolution. The cutting depth during machining is preferably within 0.5-5 mm. The cutting depth during machining is preferably constant. The cutting speed during machining is preferably within 40-400 m/min. The cutting speed during machining is preferably constant.

If the hole is in the form of a blind hole, comprising a bottom, the machining is stopped at a distance, preferably 0.5-10 mm, from the bottom of the hole.

According to an embodiment, the machining method further comprises the steps of: rotating the metal work piece in the rotational direction, machining the hole by moving the turning tool in a second feed direction, inclined in relation to the rotational axis, such that the second nose cutting edge is active.

By such a machining method, further machining of the hole can be made, especially when machining a blind hole.

The here described further machining steps are made after the above described machining steps, and include the step of rotating the metal work piece in the same rotational direction as in the above described machining steps and include the machining of the same hole with the same turning tool as in the above described machining steps.

The machining of the hole is made by moving the turning tool in a second feed direction, inclined to the rotational axis, such that the second nose cutting edge is active. Thus, the second nose cutting edge goes into cut.

The method preferably comprises the step of entering the second nose cutting edge into a surface of the metal work piece which is spaced apart from the first inner surface, formed by the first nose cutting edge.

The longitudinal axis of the turning tool is parallel to the rotational axis. The second feed direction may be perpendicular to the rotational axis.

According to an embodiment, the machining method further comprising the steps of: rotating the metal work piece in the rotational direction, machining the hole by moving the turning tool in a third feed direction, opposite to the first feed direction, such that the second rearward cutting edge is active and such that at least a portion of the first inner surface, formed by the first nose cutting edge, is cut, and such that a second inner surface is formed by the second nose cutting edge.

By such a machining method, machining of a hole can be made faster, e.g. by machining a first pass when feeding into the hole followed by a further pass when feeding out of the hole.

The here described further machining steps include the step of rotating the metal work piece in the same rotational direction as in the above described machining steps and include the machining of the same hole with the same turning tool as in the above described machining steps.

The machining of the hole is made by moving the turning tool in a third feed direction, perpendicular to the rotational axis, and opposite to the first feed direction, such that the second nose cutting edge is active and such that at least a portion of the first inner surface, formed by the first nose cutting edge, is machined.

The surface machined or formed by the second nose cutting edge is a second inner surface, having a greater diameter than the first inner surface.

According to an embodiment, the machining method further comprises the steps of: positioning the turning tool such that a distance from the second radially distal point to first machined surface is shorter than a distance from the first radially distal point to the first machined surface, moving the turning tool in a fourth feed direction, opposite to or substantially opposite to the first feed direction, such that the turning tool is pulling chips out of the hole, and stopping the movement of the turning tool when the turning tool is completely outside the hole by an axial distance.

By such a machining method, chips can be evacuated, i.e. removed, from the hole by pulling the chips by at least the second rearward cutting edge. Especially, chips cut during the first feed direction cutting which are inside the hole can be removed.

The positioning the turning tool is thus such that a distance from the second radially distal point to the rotational axis is greater than a distance from the first radially distal point to the rotational axis. The moving the turning tool in a fourth feed direction, opposite to or substantially opposite to the first feed direction, is a retraction movement, where the turning tool is inactive, in other words no cutting edge is cutting. The purpose of the movement is to remove chips which is inside the hole, by pulling or dragging the chips out of the hole.

The metal work piece is preferably rotating around the rotational axis, although this is not necessary.

The method comprises the step of pulling the chips out of the hole by the second rearward cutting edge.

The method comprises the step of moving the second radially distal point at a constant or substantially constant distance, preferably 0.4-3 mm, from the first machined surface.

The movement of the turning tool in the axially rearward direction, i.e. out of the hole, is not stopped until the turning tool is completely outside the hole by an axial distance. Said axial distance is sufficiently large for the chips, which may have different dimensions and shapes depending numerous factors, to fall off by gravity. Said axial distance is preferably at least 5 mm, preferably 10-100 mm. Said axial distance is measured axially, i.e. parallel to the rotational axis, from the opening of the hole to the front end of the turning tool.

According to an embodiment, a computer program having instructions which when executed by the computer numerical control lathe cause the computer numerical control lathe to perform the method.

Said computer program comprises pre-programmed sequences of machine control commands which can be executed by a CNC-lathe to perform the machining method according to an embodiment.

According to an embodiment, a computer readable medium having stored thereon such a computer program.

The computer readable medium, which carries the computer program, may be in the form of any computer readable memory which carries data, such as e.g. a CD-ROM disc.

According to an embodiment, a data stream which is representative of such a computer program.

Said data stream is a sequence of digitally encoded coherent signals used to transmit information.

DESCRIPTION OF THE DRAWINGS

The present invention will now be explained in more detail by a description of different embodiments of the invention and by reference to the accompanying drawings.

FIG. 7 is a further detailed perspective view of the turning tool in

FIG. 1.

FIG. 9 is a top view of the first turning insert in FIG. 1.

FIG. 10 is a side view A of the turning insert in FIG. 9.

FIG. 11 is a front view B of the turning insert in FIG. 9.

FIG. 20 is a top view of a turning tool according to a second embodiment, comprising a first and a second turning insert.

FIG. 21 is a detailed perspective view of the turning tool in FIG. 20.

FIG. 22 is a further detailed perspective view of the turning tool in FIG. 20.

FIG. 23 is a front view of the turning tool in FIG. 20.

FIG. 24 is a perspective view of the first turning insert in FIG. 20.

FIG. 25 is a top view of the first turning insert in FIG. 24.

FIG. 26 is a side view "A" of the first turning insert in FIG. 25.

FIG. 27 is a perspective view of the second turning insert in FIG. 20.

FIG. 28 is a top view of the second turning insert in FIG. 27.

FIG. 29 is a side view "A" of the second turning insert in FIG. 28.

FIG. 30 is a detailed top view of the turning tool in FIG. 20.

FIG. 31 is a detailed bottom view of the turning tool in FIG. 20.

Figure 1:
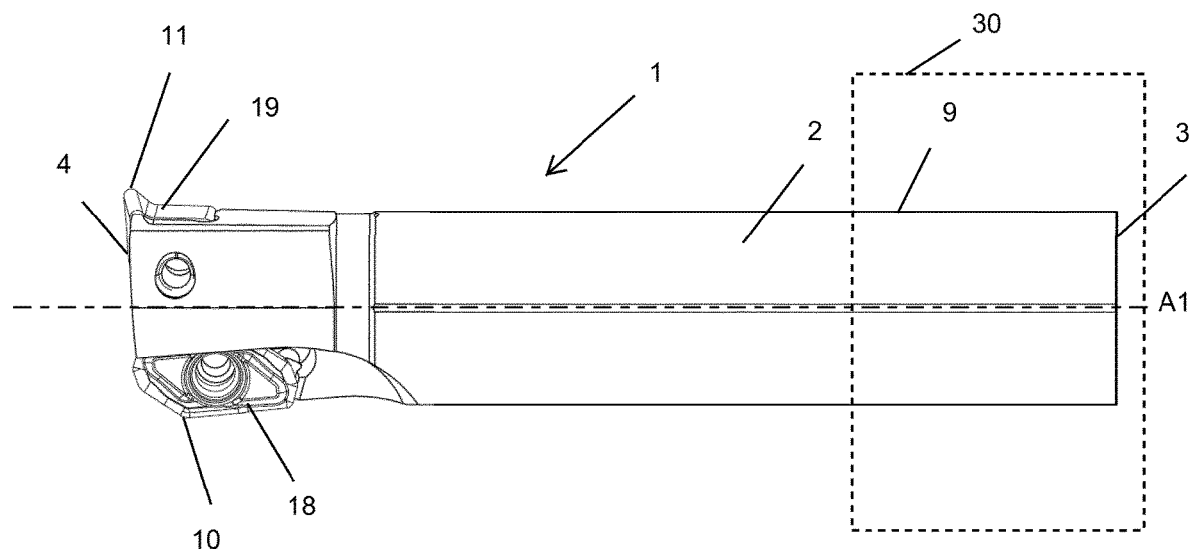
FIG. 1 is a top view of a turning tool according to a first embodiment, comprising a first and a second turning insert.

All turning tool and turning insert drawings or figures have been drawn to scale.

DETAILED DESCRIPTION OF EMBODIMENTS OF THE INVENTION

Reference is made to FIGS. 1-8, which show a turning tool 1 according to a first embodiment.

The turning tool 1 comprises a rear end 3, an opposite forward end 4 and a longitudinal center axis A1 extending therebetween.

The rear end 3 is clamped to a machine interface 30 of a machine tool, such as a numerical control lathe (not shown). The turning tool 1 comprises a tool body 2, a first turning insert 18 and a second turning insert 19. The tool body 2 comprises an external peripheral surface 9 which comprises a portion which is circular or substantially circular in cross sections perpendicular to the longitudinal center axis A1.

The tool body 2 comprises a first insert seat 20 and an opposite second insert seat 21, a first chip pocket 22, adjacent to the first insert seat 20, and an opposite second chip pocket 23, adjacent to the second insert seat 21, The first and second insert seats 20, 21 are spaced apart. The first and second chip pockets 22, 23 are spaced apart. The first and second chip pockets 22, 23 opens towards the forward end 4. The first turning insert 18 is located in the first insert seat 20. The second turning insert 19 is located in the second insert seat 21. The first and second turning inserts 18, 19 are each clampable in the respective insert seat 20, 21 by clamping means in the form of respective screws (not shown).

As can be seen in e.g. FIG. 1, the first turning insert 18 and the second turning insert 19 partially overlap in the longitudinal direction as defined by the longitudinal center axis A1.

All the above is valid also for the turning tool according to the second embodiment, seen in FIGS. 20-23.

As seen in e.g. FIGS. 9-11, the first turning insert 18 which is part of the turning tool according to the first embodiment comprises a first top surface 26, comprising the first rake face 16, and an opposite first bottom surface 28, a first nose cutting edge 5, a first forward cutting edge 12 and a first rearward cutting edge 14.

The first nose cutting edge 5 comprising a first radially distal point 10, when the first turning insert 18 is mounted in the first insert seat 20. The first nose cutting edge 5 separates and connects the first forward cutting edge 12 and the first rearward cutting edge 14, where said edges 5, 12, 14 are formed at an intersection between the first top surface 26 and a first side surface, where said first side surface connects the top and bottom surfaces 26, 28.

Figure 5:
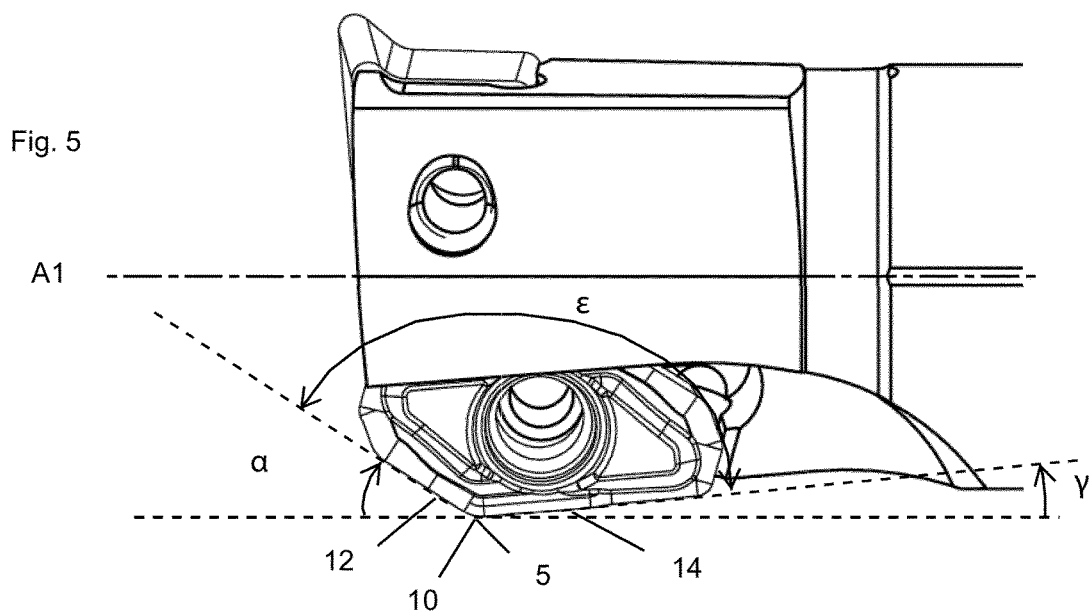
FIG. 5 is a detailed top view of the turning tool in FIG. 1.
Figure 6:
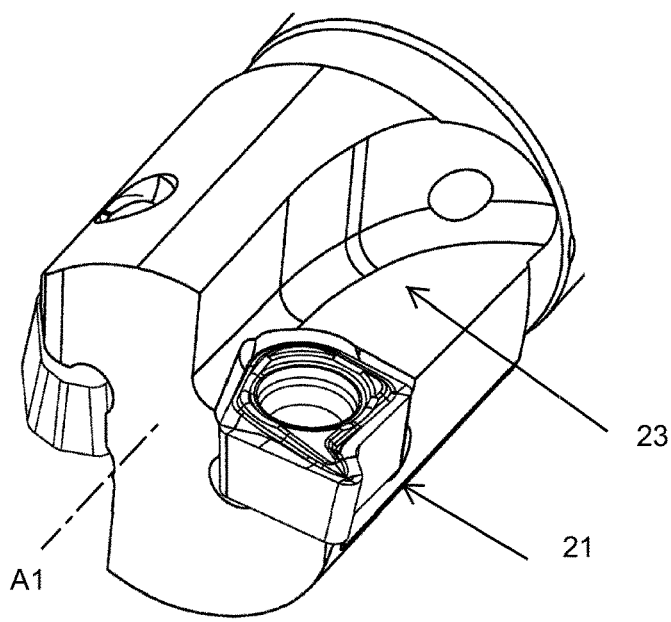
FIG. 6 is a detailed perspective view of the turning tool in FIG. 1.
Figure 7:
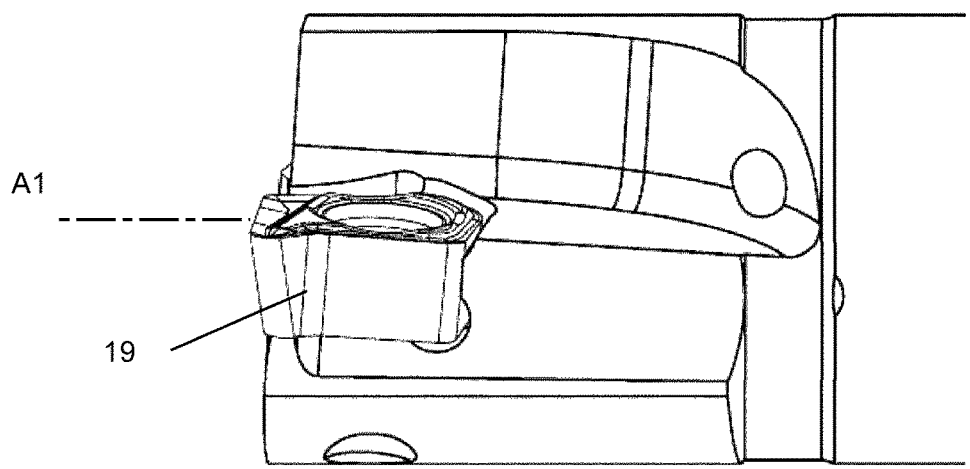
Figures 15, 16, 17:
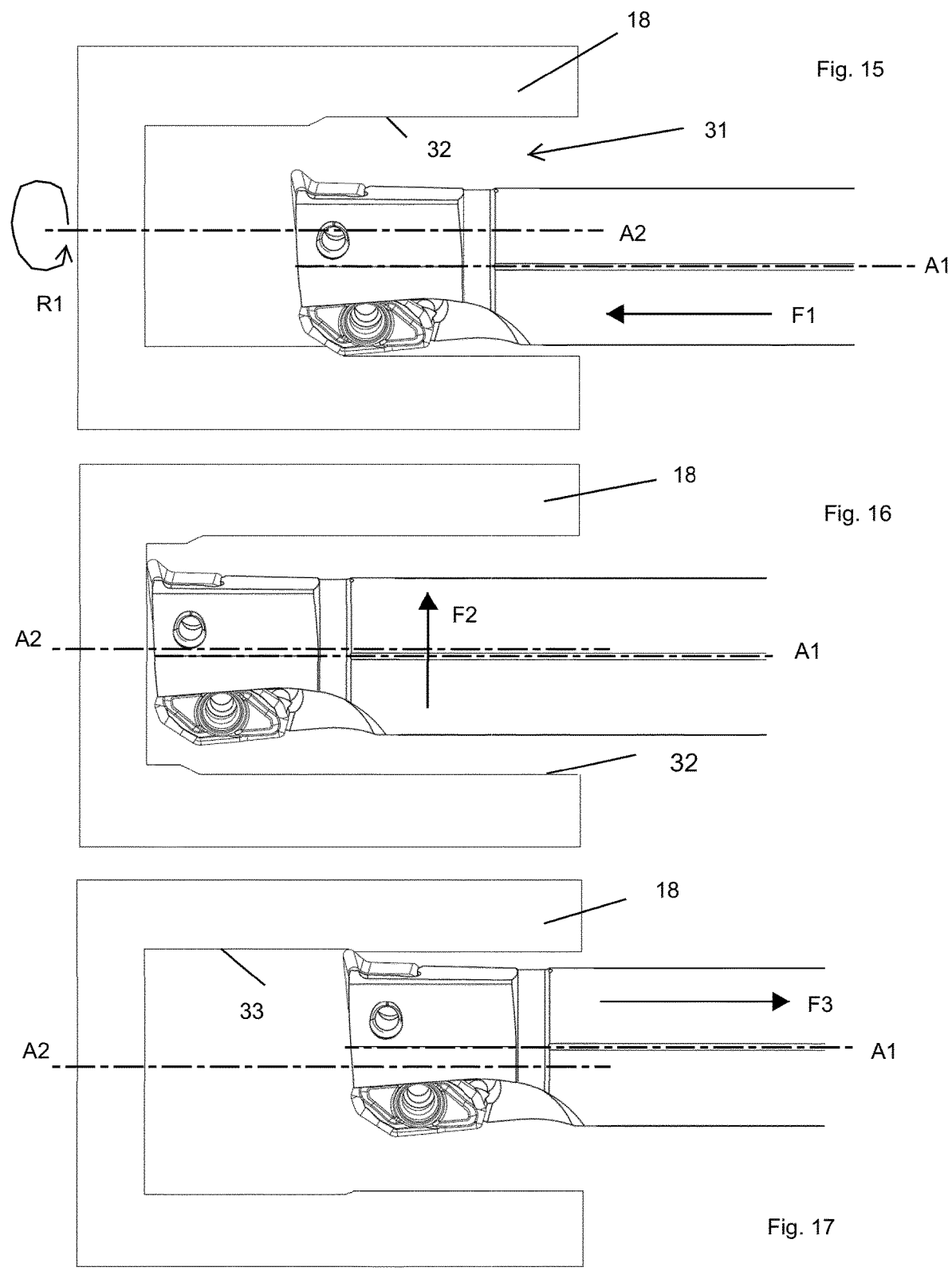
FIG. 15 is a schematic view of a machining method moving the turning tool according to the first embodiment in a first feed direction.
FIG. 16 is a schematic view of a machining method moving the turning tool according to the first embodiment in a second feed direction.
FIG. 17 is a schematic view of a machining method moving the turning tool according to the first embodiment in a third feed direction.

As can be seen in FIG. 5, the first forward cutting edge 12 forms an acute first entering angle α in longitudinal turning in a first feed direction F1 shown in FIG. 15, and the first rearward cutting edge 14 forms an acute first back clearance angle γ. The acute first entering angle α is preferably within the range of 4-40°. The acute first back clearance angle γ is within the range of 2-10°. The first nose cutting edge 5 has a first nose angle E, defined by an angle between the first forward cutting edge 12 and the first rearward cutting edge 14, which is obtuse, and preferably within the range of 100-160°.

The second turning insert 19 comprises a second top surface 27, comprising a second rake face 17, and an opposite second bottom surface 29. The second turning insert 19 comprises a second nose cutting edge 6 separating and connecting a second forward cutting edge 13 and a second rearward cutting edge 15. The second nose cutting edge 6 comprising a second radially distal point 11.

As can be seen in e.g. FIG. 1, the second radially distal point 11 being positioned ahead of the first radially distal point 10.

The second forward cutting edge 13 forms an obtuse second back clearance angle β, preferably in the range of 92-100°.

The second rearward cutting edge 15 forms an acute second entering angle δ, preferably in the range of 4-44°.

Figure 8:
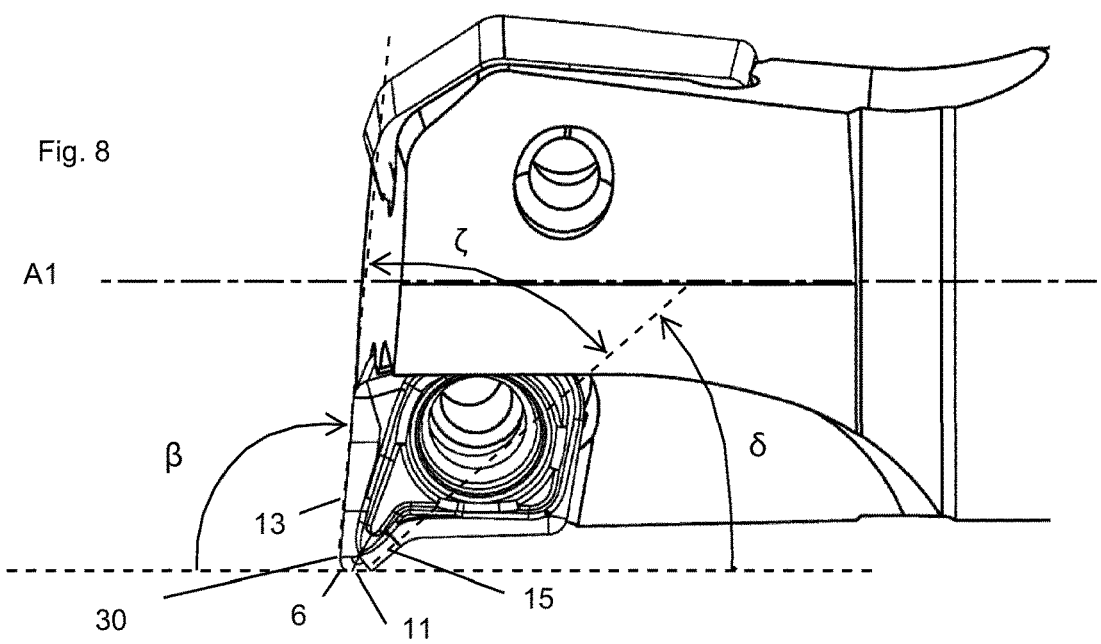
FIG. 8 is a detailed bottom view of the turning tool in FIG. 1.

As seen in FIG. 8, the second nose cutting 6 edge has a second nose angle ζ, defined by an angle between the second nose cutting edge 6 and the second forward cutting edge 13, which is acute, and preferably within the range of 40-75°.

Figure 12:
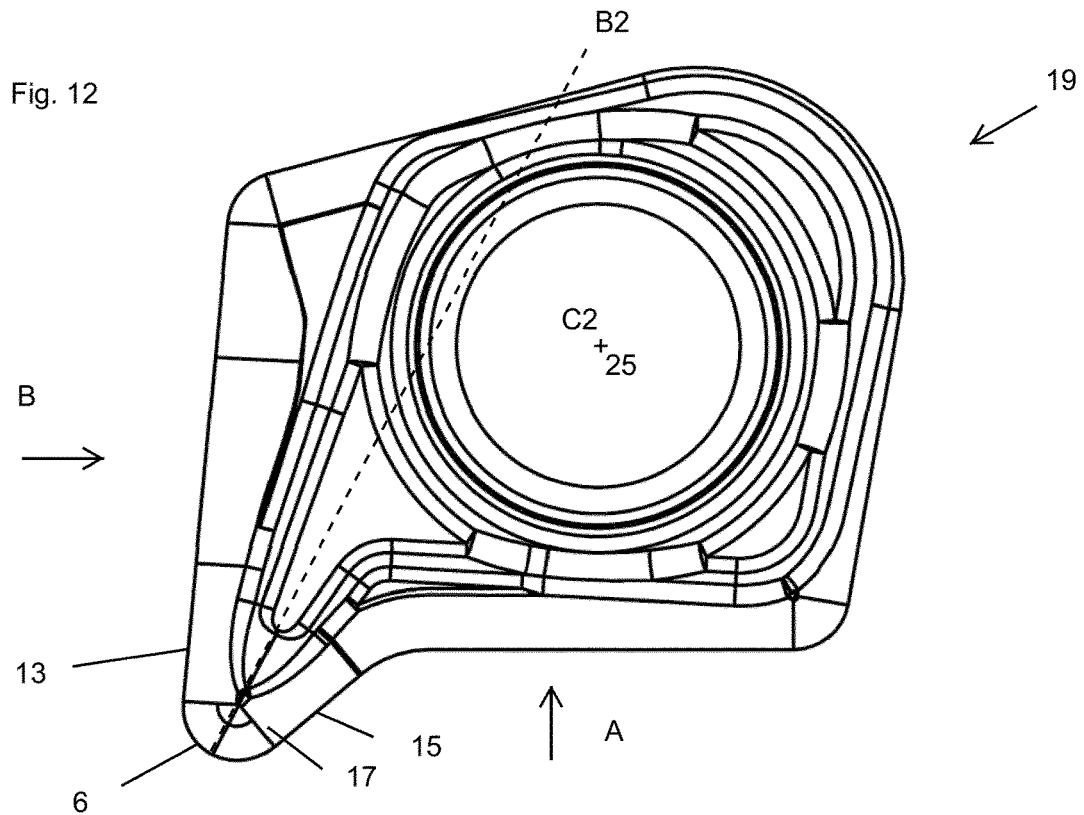
FIG. 12 is a side view A of the turning insert in FIG. 11.

As seen in FIG. 8, the second nose cutting edge 6 comprises an axially forward distal point 30 which define the singular axially forward end point of the turning tool 1. The axially forward point 30 and the second radially distal point 11 are positioned on opposite sides of the second bisector B2, which second bisector B2 extend mid-way between the second forward cutting edge 13 and the second rearward cutting edge 15, as seen in FIG. 12.

Figure 2:
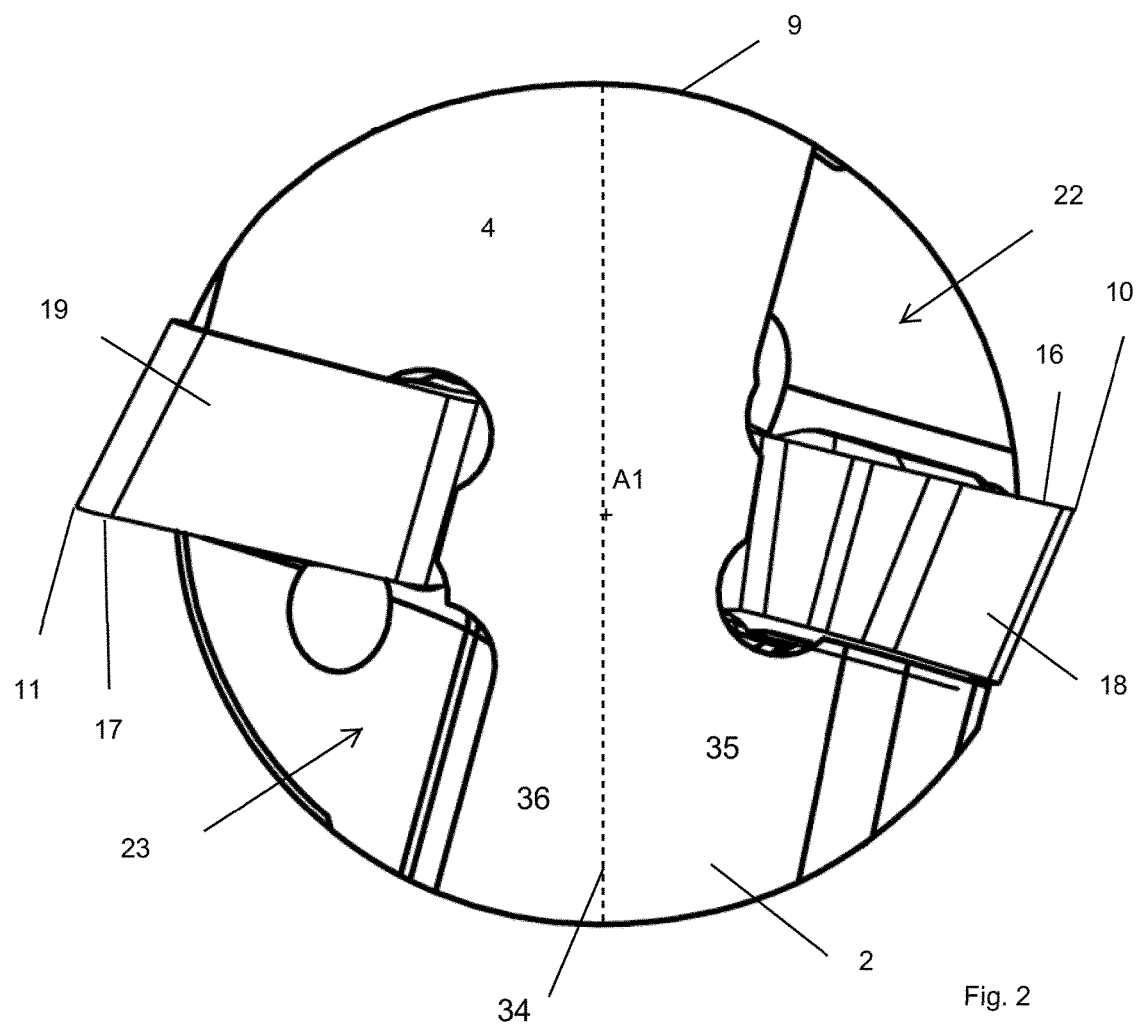
FIG. 2 is a front view of the turning tool in FIG. 1.
Figure 3:
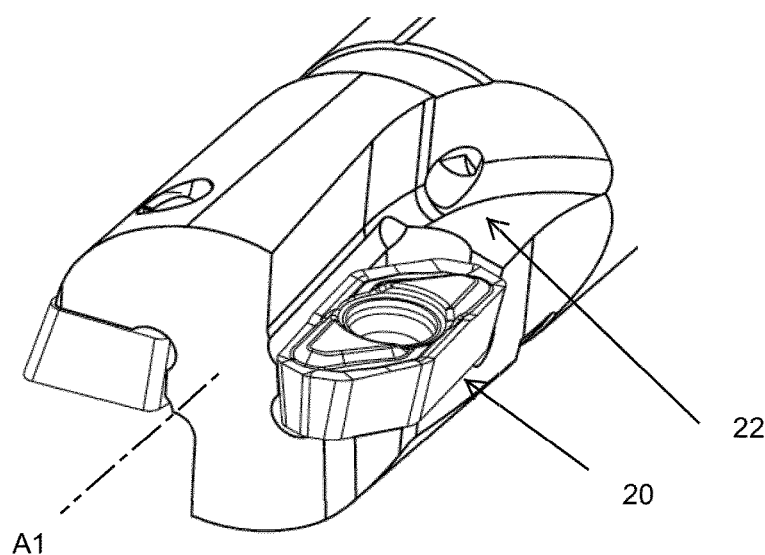
FIG. 3 is a detailed perspective view of the turning tool in FIG. 1.
Figure 4:
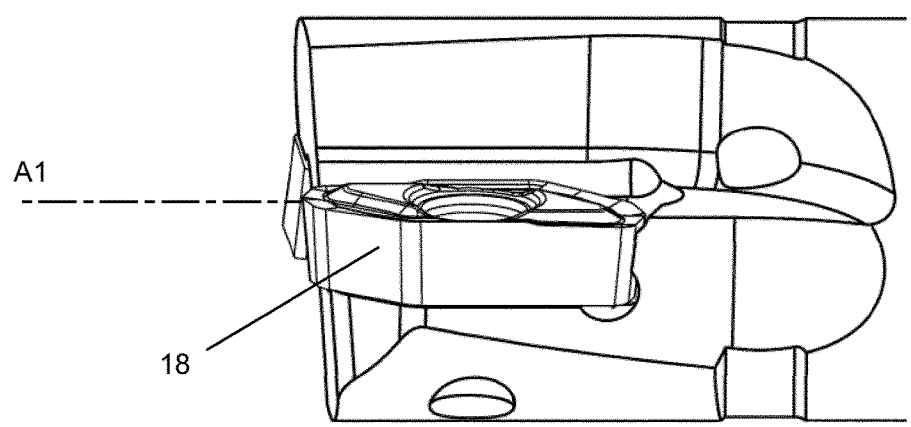
FIG. 4 is a further detailed perspective view of the turning tool in FIG. 1.

As seen in FIG. 2, the first and second radially distal points 10, 11 are positioned on opposite sides or substantially opposite sides relative to the longitudinal center axis A1. In a front view of the turning tool, as in FIG. 2, an angle between the first and second radially distal points is 180°+/−20°, preferably +/−5°.

An imaginary plane 34 is located mid-way between the first and second radially distal points 10, 11, dividing the turning tool 1 in two halves 35, 36, or two semicircle-like shapes, in a front view. The first radially distal point 10 is the point of one 35 of said halves of the turning tool 1 which is located at the greatest distance from the longitudinal center axis A1. The second radially distal point 11 is the point of the other one 36 of said halves of the turning tool 1 which is located at the greatest distance from the longitudinal center axis A1. The first and second rake faces 16, 17 facing opposite or substantially opposite directions.

As seen in FIG. 9, the first turning insert 18 is 180° symmetrical in a top view. The first turning insert 18 comprises a first screw hole 24 opening in the first top and bottom surfaces 26, 28. A first bisector B1 extend mid-way between the first forward cutting edge 12 and the first rearward cutting edge 14. The first bisector B1 or an extension of the first bisector B1 is spaced apart from a first center axis C1 of the first screw hole 24. The first rearward cutting edge 14 is straight in a top view, between a first end, adjacent to the first nose cutting edge 5, and an opposite second end. As seen in FIGS. 10 and 11, a distance from the first forward cutting edge 12 to the first bottom surface 28 is decreasing away from the first nose cutting edge 5. In other words, a distance from said second end to the first bottom surface 28 is shorter than a distance from said first end to the first bottom surface 28.

The first top surface 26 is non-planar. The first top surface comprises two protrusions, functioning as chip breakers or chip formers.

Figure 13:
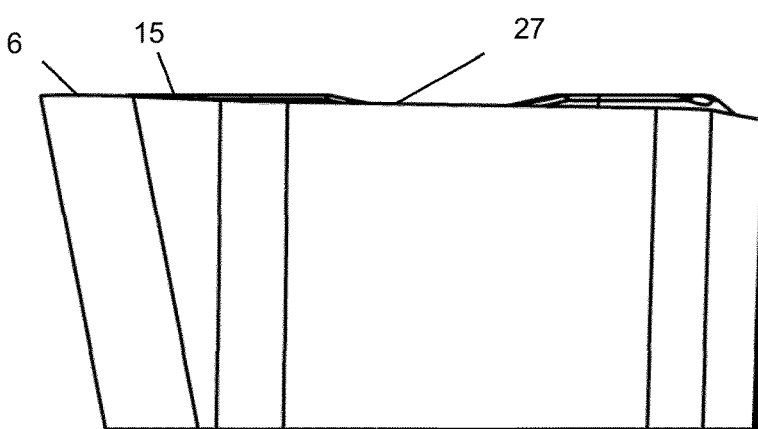
FIG. 13 is a front view B of the turning insert in FIG. 11.
Figure 14:
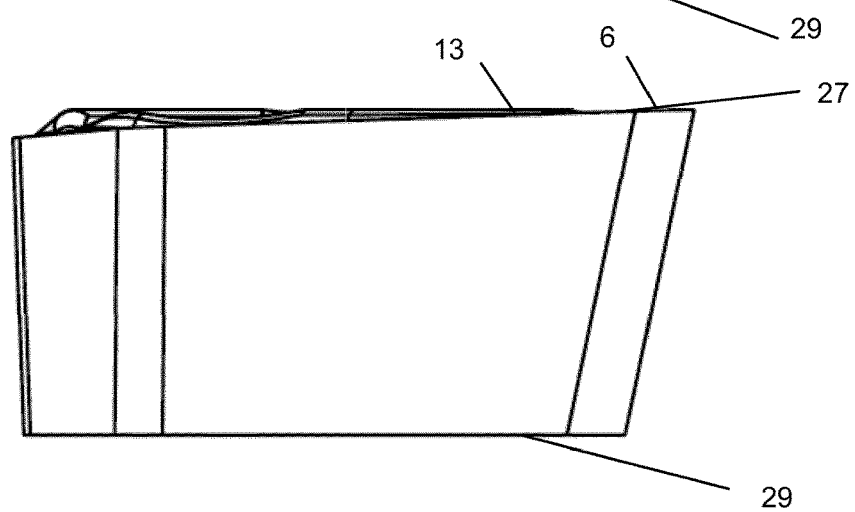
FIG. 14 is a second side view of the turning insert in FIG. 12.

As seen in FIG. 12-14, the second turning insert 19 comprises a second screw hole 25 opening in the second top and bottom surfaces 27, 29. The second bisector B2 or an extension of the second bisector B2 is spaced apart from a second center axis C2 of the second screw hole 25. As best seen in FIG. 13, a distance from the second rearward cutting edge 15 to the second bottom surface 29 is decreasing away from the second nose cutting edge 6. As best seen in FIG. 14, a distance from the second forward cutting edge 13 to the second bottom surface 29 is decreasing away from the second nose cutting edge 6.

The second forward cutting edge 13 and the second rearward cutting edge 15 are each substantially straight. The second top surface 27 comprises a protrusion, which protrusion intersect the second bisector B2 in a top view, as seen in FIG. 12.

The second turning insert 19 comprise exactly one set of cutting cutting edges.

Attention is now drawn to the turning tool 1 according to the second embodiment, which comprises a tool body 2, a first turning insert 18 and a second turning insert 19 having respective shapes which is different compared to the turning tool according to the first embodiment. The turning tool according to the second embodiment is shown in FIGS. 20-23. As seen in FIGS. 24-26, the first turning insert 18 is 90° symmetrical in a top view, and comprises a first screw hole 24 opening in the first top and bottom surfaces 26, 28. A first bisector B1 extend mid-way between the first forward cutting edge 12 and the first rearward cutting edge 14, and said first bisector B1 intersect the first center axis Cl of the first screw hole 24.

The first rearward cutting edge 14 in a top view, as seen in FIG. 24, is substantially straight. The first top surface 26 comprises a protrusion, which functions as a chip breaker or a chip former.

As seen in FIGS. 27-29, the second turning insert 19 comprise 3 sets of cutting edges. The second turning insert 19 is 120° symmetrical in a top view, as seen in FIG. 28. As best seen in FIG. 29, a distance from the second rearward cutting edge 15 to the second bottom surface 29 is decreasing away from the second nose cutting edge 6.

Likewise, as shown in FIG. 29, a distance from the second forward cutting edge 13 to the second bottom surface 29 is decreasing away from the second nose cutting edge 6.

As can be seen from the figures of the turning tool 1 according to the second embodiment, specifically FIGS. 20-23 and 30-31, the turning inserts 18, 19 are securely clamped to the tool body 2 by means of respective clamping screws.

Attention is now drawn to FIGS. 15-19, which show a machining method or a turning operation, or more specifically machining steps or sequences. The turning tool shown in FIGS. 15-19 is the turning tool 1 according to the first embodiment. However, the turning tool 1 according to the second embodiment may alternatively be used in a corresponding manner. In FIGS. 15-19, it is shown a metal work piece 18 comprising a hole 31, which metal work piece 18 is clamped (not shown) to the left-hand side in the figures by a computerized numerical control lathe (not shown). In FIGS. 15-19, the hole 31 is in the form of a blind hole. The turning tool 1 is connected to a machine interface (not shown) of the computerized numerical control lathe.

The metal work piece 18 is rotatable in a rotational direction R1 about a rotational axis A2. The longitudinal axis A1 of the turning tool 1 is parallel to the rotational axis A2.

In FIG. 15, the metal work piece 18 rotates in the rotational direction R1 about the rotational axis A2. Machining of the hole 31 is made by moving the turning tool 1 in a first feed direction F1, parallel to the rotational axis A2, such that the first forward cutting edge 12 is active and such that a first inner surface 32 is formed by the first nose cutting edge 5. The moving of the turning tool 1 in the first feed direction F1 is such that the turning tool 1 is moved deeper into the hole 31. In other words, a distance from the forward end 4 of the turning tool 1 to the opening of the hole 31, through which opening the turning tool enters the hole, is increasing.

In FIG. 15, the entry of cut starts at the opening of the hole 31. The movement of the turning tool 1 in the first feed direction F1 is a linear motion.

Attention is now drawn to FIG. 16, which show a machining step which preferably is performed after the step shown in FIG. 15. The metal work piece 18 is rotating around the rotational axis A2. in the rotational direction R1. The machining an inner surface of the hole 31 is made by moving the turning tool 1 in a second feed direction F2, which is inclined in relation to the rotational axis A2, such that the second nose cutting edge 6 is active, i.e. goes into cut, and such that the first nose cutting edge 5 is inactive. As seen in FIG. 16, the second feed direction F2 is perpendicular to the rotational axis A2.

More specifically, FIG. 16 show a position of the turning tool 1 before the second nose cutting edge 6 goes into cut. The movement of the turning tool 2 in the second feed direction F2 is preferably stopped at a greater diameter than, but spaced apart from, the first inner surface 32.

The movement of the turning tool 1 in the second feed direction F2 may be a linear motion, or alternatively a curved motion, such as along the circle segment.

Attention is now drawn to FIG. 17, which show a machining step which preferably is after the step shown in FIG. 15, and preferably is performed after the step shown in FIG. 16. As in FIGS. 15 and 16, the metal work piece 18 is rotated about the rotational axis A2 in the rotational direction R1, and the longitudinal axis A1 of the turning tool 1 is parallel to the rotational axis A2. The machining of the hole 31 by moving the turning tool 1 in a third feed direction F3, opposite to the first feed direction F1, such that the second rearward cutting edge 15 is active and such that at least a portion of the first inner surface 32, formed by the first nose cutting edge 5, is cut. As the turning tool 1 is moved in the third feed direction F3, in a direction out of the hole, a second inner surface 33 is formed by the second nose cutting edge 6, the second inner surface having a greater diameter than the first inner surface 32. The third feed direction F3 is a linear motion. The depth of cut during cutting in the third feed direction F3 is preferably smaller than during cutting in the first feed direction F1.

Figure 18:
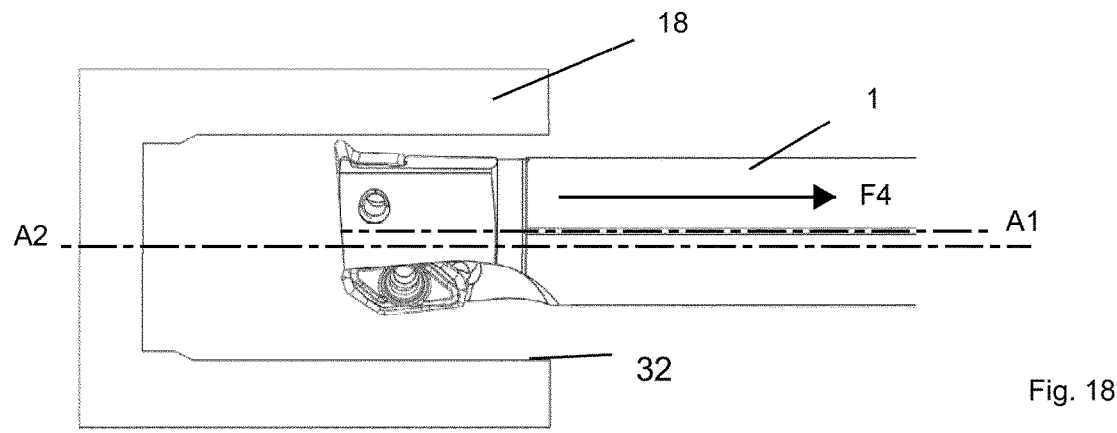
FIG. 18 is a schematic view of a machining method moving the turning tool according to the first embodiment in a fourth feed direction.
Figure 19:
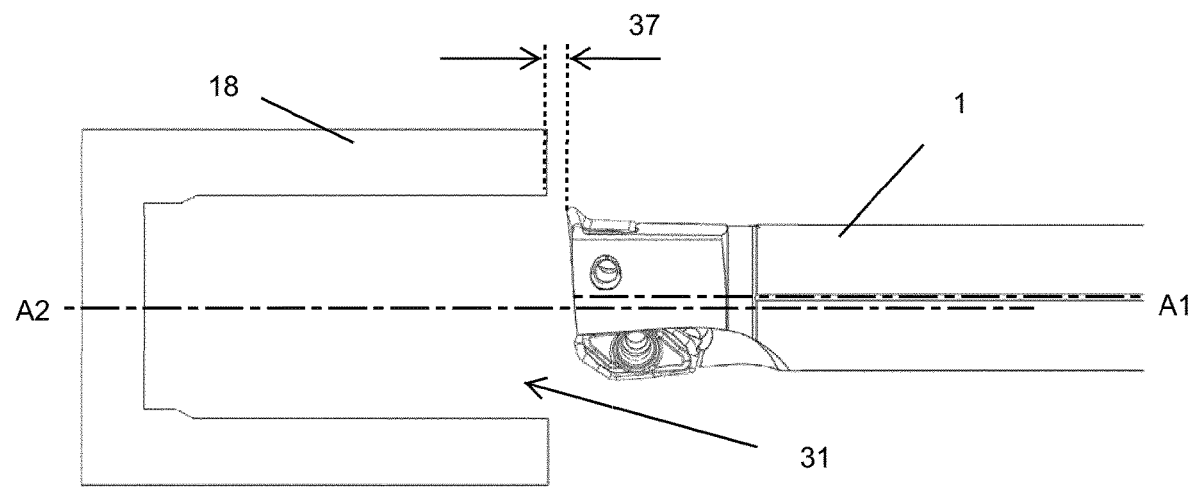
FIG. 19 is a schematic view of a machining method using the turning tool according to the first embodiment, showing the end position after movement of the turning tool in the fourth feed direction.

Attention is now drawn to FIGS. 18-19, which show a step where the the turning tool 1 is positioned such that a distance from the second radially distal point 11 to first machined surface 32 is shorter than a distance from the first radially distal point 10 to the first machined surface 32. Said step is performed after step described when the machining in the first feed direction F1.

The second radially distal point 11 is spaced apart, preferably by a distance of 0.4-3 mm, from the first machined surface 32.

As seen in FIG. 18, the turning tool 1 is moved without cutting in a fourth feed direction F4, opposite to or substantially opposite to the first feed direction F1, such that the turning tool 1 is able to pull out chips (not shown) out of the hole 31.

As seen in FIG. 19, said movement is stopped as the turning tool 1 is completely outside the hole 31 by an axial distance 37.

The longitudinal axis A1 of the turning tool 1 is parallel to the rotational axis A2 during the step.

The first feed direction F1 step is performed first. Preferably, the next step is the fourth feed direction F4 step, preferably followed by the second feed direction F2 step, which in turn is preferably followed by the third feed direction F3 step.

Although the turning tool 1 described is preferably used for internal turning, it may also be used for other types of turning, such as external turning and facing. In other words, the turning tool 1 is a versatile turning tool.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential.

To the extent that structure, material, or acts are presently considered to be essential, they are identified as such. Terms such as "upper", "lower", "top", "bottom", "forward", "front", "rearward" and "rear" refer to features as shown in the current drawings and as perceived by the skilled person.

The invention claimed is:

1. A turning tool for internal turning of a metal work piece, the turning tool comprising:
   a rear end, an opposite forward end and a longitudinal center axis extending therebetween defining a forward direction toward the forward end;
   a first nose cutting edge including a first radially distal point having an associated first rake face, the first nose cutting edge separating and connecting a first forward cutting edge and a first rearward cutting edge; and a second nose cutting edge including a second radially distal point having an associated second rake face, the second nose cutting edge separating and connecting a second forward cutting edge and a second rearward cutting edge, the first and second radially distal points being positioned on opposite sides or substantially opposite sides relative to the longitudinal center axis, the first and second rake facing opposite or substantially opposite directions, the second radially distal point being positioned ahead of the first radially distal point, the first forward cutting edge forming an acute first entering angle with the forward direction as defined by the longitudinal axis, the second forward cutting edge forming an obtuse second back clearance with the forward direction as defined by the longitudinal axis, and the second rearward cutting edge forming an acute second entering angle with the forward direction as defined by the longitudinal axis, wherein the first nose cutting edge has a first nose angle, defined by an angle between the first forward cutting edge and the first rearward cutting edge, which is obtuse.

2. The turning tool according to claim 1, wherein the second nose cutting edge includes an axially forward distal point which defines the singular axially forward end point of the turning tool, wherein a second bisector extends mid-way between the second forward cutting edge and the second rearward cutting edge, and wherein the axially forward point and the second radially distal point are positioned on opposite sides of the second bisector.

3. The turning tool according to claim 1, wherein the first rearward cutting edge forms an acute first back clearance angle.

4. The turning tool according to claim 1, wherein the acute first entering angle is 4-40°.

5. The turning tool according to claim 1, wherein the obtuse second back clearance angle is 91-120°.

6. The turning tool according to claim 1, wherein the acute second entering angle is 4-80°.

7. The turning tool according to claim 1, further comprising a tool body; a first turning insert; and a second turning insert, wherein the tool body includes an external peripheral surface, wherein the external peripheral surface includes a portion which is circular or substantially circular in cross sections perpendicular to the longitudinal center axis, wherein the tool body includes a first insert seat and an opposite second insert seat, wherein the tool body includes a first chip pocket, adjacent to the first insert seat, and an opposite second chip pocket, adjacent to the second insert seat, wherein the first and second insert seats are spaced apart, wherein the first and second chip pockets are spaced apart, wherein the first and second chip pockets opens towards the forward end, wherein the first turning insert is located in the first insert seat, wherein the second turning insert is located in the second insert seat, wherein the first turning insert includes the first nose cutting edge, the first rake face, the first forward cutting edge and the first rearward cutting edge, wherein the first turning insert includes a first top surface, having the first rake face, and an opposite first bottom surface, wherein the second turning insert includes the second nose cutting edge, the second rake face, the second forward cutting edge and the second rearward cutting edge, wherein the second turning insert includes a second top surface, having the second rake face, and an opposite second bottom surface, and wherein the first turning insert and the second turning insert partially overlap in the longitudinal direction as defined by the longitudinal center axis.

8. The turning tool according to claim 7, wherein the first turning insert is 90° or 180° symmetrical in a top view, wherein the first turning insert includes a first screw hole opening in the first top and bottom surfaces wherein a first bisector extends mid-way between the first forward cutting edge and the first rearward cutting edge, and wherein the first rearward cutting edge in a top view is straight or substantially straight between a first end, adjacent to the first nose cutting edge, and an opposite second end.

9. The turning tool according to claim 7, wherein the second turning insert includes a second screw hole opening in the second top and bottom surfaces, wherein a second bisector extends mid-way between the second forward cutting edge and the second rearward cutting edge, wherein the second bisector or an extension of the second bisector is spaced apart from a second center axis of the second screw hole, wherein a distance from the second rearward cutting edge to the second bottom surface is decreasing away from the second nose cutting edge, and wherein a distance from the second forward cutting edge to the second bottom surface is decreasing away from the second nose cutting edge.

10. The turning tool according to claim 7, wherein at least a portion of the second forward cutting edge is longitudinally forward of a forward end of the tool body.

11. The turning tool according to claim 7, wherein the turning tool includes exactly two turning inserts, and wherein the two turning inserts are different in shape.

12. A machining method comprising the steps of:
providing a metal work piece including a hole;
providing a computerized numerical control lathe;
providing a turning tool according to claim 1;
clamping the metal work piece by the computerized numerical control lathe;
connecting the turning tool to a machine interface of the computerized numerical control lathe;
rotating the metal work piece in a rotational direction around a rotational axis thereof;
arranging the longitudinal center axis of the turning tool parallel to the rotational axis;
machining the hole by moving the turning tool in a first feed direction, parallel to or substantially parallel to the rotational axis, such that the first forward cutting edge is active and such that a first inner surface is formed by the first nose cutting edge.

13. The machining method according to claim 12, further comprising the steps of:
rotating the metal work piece in the rotational direction; and
machining the hole by moving the turning tool in a second feed direction, inclined in relation to the rotational axis, such that the second nose cutting edge is active.

14. Machining method according to claim 12, further comprising the steps of:
rotating the metal work piece in the rotational direction; and
machining the hole by moving the turning tool in a third feed direction, opposite to the first feed direction, such that the second rearward cutting edge is active and such that at least a portion of the first inner surface, formed by the first nose cutting edge, is cut, and such that a second inner surface is formed by the second nose cutting edge.

15. Machining method according to claim 12, further comprising the steps of:
positioning the turning tool such that a distance from the second radially distal point to first machined surface is shorter than a distance from the first radially distal point to the first machined surface;

moving the turning tool in a fourth feed direction, opposite to or substantially opposite to the first feed direction, such that the turning tool is pulling chips out of the hole; and stopping the movement of the turning tool when the turning tool is completely outside the hole by an axial distance.

16. A computer program having instructions which when executed by the computer numerical control lathe cause the computer numerical control lathe to perform the method according to claim 12.

17. A computer readable medium having stored thereon a computer program according to claim 16.

18. A data stream which is representative of a computer program according to claim 16.

* * * * *